United States Patent [19]

Bishel et al.

[11] Patent Number: 5,308,407
[45] Date of Patent: May 3, 1994

[54] ELECTROSLAG WELDING FLUX

[75] Inventors: Robert A. Bishel; Evan B. Hinshaw, both of Huntington, W. Va.

[73] Assignee: Inco Alloys International, Inc., Huntington, W. Va.

[21] Appl. No.: 48,686

[22] Filed: Apr. 16, 1993

[51] Int. Cl.$^5$ ............................................. B23K 35/34
[52] U.S. Cl. ................................................. 148/26; 148/23
[58] Field of Search ................... 148/23, 26; 75/10.24

[56] References Cited

U.S. PATENT DOCUMENTS

| | | | |
|---|---|---|---|
| 3,625,757 | 12/1971 | Wiehe | 148/26 |
| 3,627,592 | 12/1971 | Schmidt | 148/23 |
| 3,639,161 | 2/1972 | Trattner | 148/26 |
| 3,715,201 | 2/1973 | Schlatter | 75/10.24 |
| 3,771,997 | 11/1973 | Clark | 148/26 |
| 3,841,923 | 10/1974 | Dudko | 148/26 |
| 3,857,702 | 12/1974 | Corbett | 148/26 |
| 3,879,192 | 4/1975 | Segawa | 75/10.24 |
| 3,950,163 | 4/1976 | Nafziger | 75/10.24 |
| 4,376,881 | 3/1983 | Safonnikov et al. | 219/73.1 |
| 4,436,563 | 3/1984 | Tanaka et al. | 148/26 |
| 4,437,906 | 3/1984 | Tateishi et al. | 148/26 |
| 4,454,406 | 6/1984 | Safonnikov et al. | 219/73.1 |
| 4,575,606 | 3/1986 | Safonnikov et al. | 219/73.1 |

FOREIGN PATENT DOCUMENTS 54-014346  2/1979  Japan .
3-035032   2/1991  Japan .

Primary Examiner—Peter D. Rosenberg
Attorney, Agent, or Firm—Blake T. Biederman; Edward A. Steen

[57] ABSTRACT

The invention provides an electroslag welding flux that is especially useful for welding copper-nickel alloys. The electroslag flux contains by weight percent 50 to 95 fluoride compound, 0 to 45 oxide compound, 1 to 25 rare earth-containing material, 1 to 45 potassium-containing material and 0 to 25 metallic. Advantageously, the flux contains by weight percent 60 to 90 fluoride compound, 5 to 40 oxide compound, 2 to 20 rare earth material, 1 to 20 metallic, 2 to 35 potassium-containing material, 0 to 15 carbonate and 0 to 35 binder. Most advantageously, the flux contains by weight percent 65 to 90 fluoride compound, 5 to 35 oxide compound, 2 to 15 rare earth-containing material, 1 to 15 metallic, 3 to 35 potassium-containing material, 0 to 5 carbonate and 1 to 35 binder.

20 Claims, No Drawings

ELECTROSLAG WELDING FLUX

TECHNICAL FIELD

This invention relates to fluxes useful in electroslag welding and particularly to fluxes useful in electroslag welding nickel, copper-nickel, and nickel-chromium alloys.

BACKGROUND OF THE INVENTION

Electroslag welding uses electrical current to produce a molten slag pool from a powdered flux. The molten slag pool melts a filler metal as it is fed into the molten slag. The electrical resistivity of the molten slag provides sufficient heat to continuously melt the filler metal as it is fed into the molten slag pool. During electroslag welding, the molten slag "floats" on the metal to provide a barrier that limits oxidation of the molten filler metal.

Electroslag welding has been used for several years to deposit high quality weld metal at high deposition rates. Materials such as low-carbon steels, medium-carbon steel, low alloy steel, stainless steels and nickel-based alloys have been welded by electroslag welding techniques. Electroslag welding has provided an effective method of coating ship propeller shafts with Monel® nickel-copper alloys and Inconel® nickel-chromium alloys. (Monel and Inconel are registered trademarks of the Inco family of companies.) However, as far as known, no one to date has developed a technique for crack free electroslag welding of copper-base alloys such as 70Cu-30Ni. Due to high thermal conductivity and slag removal problems, copper-base alloys are particularly difficult to electroslag weld.

It is an object of this invention to provide a flux useful for electroslag welding of copper-nickel alloys.

It is a further object of this invention to provide an electroslag welding flux useful for both copper-nickel and nickel-chromium alloys.

SUMMARY OF THE INVENTION

The invention provides an electroslag welding flux that is especially useful for welding copper-nickel alloys. The electroslag flux contains by weight percent 50 to 95 fluoride compound, 0 to 45 oxide compound, 1 to 25 rare earth-containing material, 1 to 45 potassium-containing material and 0 to 25 metallic. Advantageously, the flux contains by weight percent 60 to 90 fluoride compound, 5 to 40 oxide compound, 2 to 20 rare earth material, 1 to 20 metallic, 2 to 35 potassium-containing material, 0 to 15 carbonate and 0 to 35 binder. Most advantageously, the flux contains by weight percent 65 to 90 fluoride compound, 5 to 35 oxide compound, 2 to 15 rare earth-containing material, 1 to 15 metallic, 3 to 35 potassium-containing material, 0 to 5 carbonate and 1 to 35 binder. The fluxes are heated by electrical resistance to form a molten slag pool. Metal strip is then continuously melted in the molten slag pool to electroslag weld a metal strip.

DESCRIPTION OF PREFERRED EMBODIMENT

It has been discovered that a combination of fluorides, potassium and rare-earth-containing materials may be used to produce an electroslag flux capable of welding copper-nickel alloys.

The following series of electroslag flux compositions contained in Tables 1 and 2 were evaluated in an attempt to provide an electroslag flux capable of electroslag welding copper-nickel and nickel-chromium alloys.

TABLE 1

| CODE IDENTIFICATION | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Bentonite | — | — | — | — | — | — | — | — | — | — | — | — | — | — | — | — | — | — | — | — |
| Ground limestone | — | — | — | — | — | — | — | — | — | — | — | 5 | — | — | — | — | — | — | — | — |
| Calcium silicate (Wollastonite) | — | — | — | — | — | — | — | 5 | — | 4 | 4 | 4 | — | — | — | — | — | — | — | — |
| Calcium fluoride (Fluorspar) | 43 | 43 | 50 | 60 | 50 | 50 | 60 | 60 | 57 | 57 | 53 | 53 | 53 | 57 | 58 | 57 | 60 | 60 | 60 | 60 |
| Nephiline syenite | — | — | — | — | — | — | — | — | — | 5 | — | — | — | — | — | — | — | — | — | — |
| Calcined alumina | 8 | 8 | 10 | 10 | 20 | 20 | 13 | 15 | 15 | 15 | 15 | 15 | 15 | 13 | 13 | 15 | 15 | 14 | 12 | 10 |
| Magnesium oxide (Periclase) | 5 | 5 | 5 | 5 | 5 | 5 | 5 | 5 | 5 | 5 | 5 | 5 | 5 | 5 | 5 | 5 | 5 | 5 | — | 5 |
| Electrolytic manganese | 1 | 1 | 1 | 1 | 1 | 1 | 1 | — | — | — | — | — | — | 1 | 1 | 1 | — | 1 | 8 | 5 |
| Nickel magnesium | — | — | — | — | — | — | — | — | — | — | — | — | — | — | — | — | — | — | — | — |
| Chrome metal powder | 1 | 3 | 3 | 3 | 3 | 3 | — | — | — | — | — | — | — | — | — | — | — | — | — | — |
| Rare earth silicide | — | — | — | — | — | — | — | — | — | — | — | — | — | — | — | — | — | — | — | — |
| Potassium titanate | — | — | — | — | — | — | — | — | — | — | — | — | 5 | — | 2 | — | — | — | — | — |
| Potassium titanium fluoride | — | — | — | — | — | — | — | — | — | — | — | — | — | — | — | — | — | — | — | — |
| Trimanox | — | — | — | — | — | — | — | — | — | — | — | — | — | — | — | — | — | — | — | — |
| Zirconium oxide | — | — | — | — | — | — | — | — | — | — | — | — | — | 2 | — | 2 | — | — | — | — |
| Fe2O3 | — | — | — | — | — | — | — | — | — | — | — | — | — | 1 | — | — | — | — | — | — |
| Potassium zirconium fluoride | — | — | — | — | — | — | — | — | — | — | — | — | — | — | — | — | — | — | — | — |
| Cerium fluoride | 42 | 42 | 31 | 21 | 21 | 11 | 21 | 20 | 18 | 18 | 18 | 18 | 18 | 21 | 21 | 20 | 20 | 20 | 20 | 20 |
| Synthetic Cryolite | — | — | — | — | — | — | — | — | — | — | 5 | — | — | — | — | — | — | — | — | — |
| Chromium with 10% nitrogen | — | — | — | — | — | — | — | — | — | — | — | — | — | — | — | — | — | — | — | — |

TABLE 2

| CODE IDENTIFICATION | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| Bentonite | — | — | — | — | — | — | — | — | — | — | 1 | — | — | — | — | — | — | — | — | — |
| Ground limestone | — | — | — | — | — | — | — | — | — | — | — | — | — | — | — | — | — | — | — | — |
| Calcium silicate (Wollastonite) | — | — | — | — | — | — | — | — | — | — | — | — | — | — | — | — | — | — | — | — |
| Calcium fluoride (Fluorspar) | 60 | 60 | 60 | 60 | 80 | 60 | 59 | 60 | 63 | 70 | 68 | 68 | 68 | 70 | 70 | 70 | 70 | 70 | 70 | 68 |
| Nephiline syenite | — | — | — | — | — | — | — | — | — | — | — | — | — | — | — | — | — | — | — | — |
| Calcined alumina | 15 | 15 | 14 | 13 | 10 | 10 | 10 | 10 | 10 | 11 | 11 | 12 | 12 | 10 | 10 | 10 | 11 | 12.5 | 10 | 10 |
| Magnesium oxide (Periclase) | 3 | 2 | 3 | 3 | 5 | 3 | 3 | 3 | 3 | 5 | 3 | 3 | 3 | 5 | 5 | 5 | 5 | 5 | 5 | 5 |
| Electrolytic manganese | 1 | 1 | 1 | 1 | 2 | 1 | 1 | 1 | 1 | 2 | 1 | 1 | 1 | 2 | 2 | 2 | 1 | 1 | 1 | 1 |

TABLE 2-continued

| CODE IDENTIFICATION | MIXED NUMBERS | | | | | | | | | | | | | | | | | | | |
|---|---|---|---|---|---|---|---|---|---|---|---|---|---|---|---|---|---|---|---|---|
| | 21 | 22 | 23 | 24 | 25 | 26 | 27 | 28 | 29 | 30 | 31 | 32 | 33 | 34 | 35 | 36 | 37 | 38 | 39 | 40 |
| Nickel magnesium | — | — | — | — | — | — | — | — | — | — | — | — | 2 | — | — | — | — | — | — | — |
| Chrome metal powder | 1 | 1 | 1 | — | — | — | — | — | — | — | — | — | — | — | — | — | — | — | — | — |
| Rare earth silicide | — | 0.5 | — | — | — | — | — | — | — | — | — | — | — | — | — | — | — | — | — | — |
| Potassium titanate | — | — | — | — | — | — | 2 | — | 4 | 2 | 2 | 2 | 2 | — | — | — | — | — | — | — |
| Potassium titanium fluoride | — | — | — | 2 | 2 | 6 | 6 | 20 | 2 | — | — | — | — | — | — | — | — | — | 3 | 5 |
| Trimanox (MnCO$_3$) | — | — | — | — | — | — | — | — | — | — | — | — | — | — | — | — | — | — | — | — |
| Zirconium oxide | — | — | — | — | — | — | — | 2 | — | 2 | 2 | — | — | — | — | — | — | — | — | — |
| Fe$_2$O$_3$ | — | — | — | — | — | — | — | — | — | — | — | — | — | — | — | — | — | — | — | — |
| Potassium zirconium fluoride | — | — | — | — | — | — | — | — | — | — | — | — | — | 2 | 3 | 6 | 3 | 1.5 | 3 | 3 |
| Cerium fluoride | 21 | 21 | 21 | 21 | 1 | 20 | 19 | 6 | 15 | 10 | 12 | 12 | 12 | 10 | 10 | 10 | 10 | 10 | 10 | 10 |
| Synthetic Cryolite | — | — | — | — | — | — | — | — | — | — | — | — | — | — | — | — | — | — | — | — |
| Chromium with 10% nitrogen | 0.5 | — | — | — | — | — | — | — | — | — | — | — | — | — | — | — | — | — | — | — |

Heat number 7 was the first pilot flux run. Heat number 7 did not operate as effectively as the lab mixes. Heat number 34, containing a potassium compound for effective slag removal, was then used in a second pilot run. Heat number 34 was particularly effective at electroslag welding 70/30 copper-nickel alloys. Evaluation of the fluxes of tables 1 and 2 resulted in the discovery that the flux composition ranges contained Table 3* were particularly effective for electroslag welding copper-nickel alloys.

TABLE 3

| | BROAD | INTERMEDIATE | NARROW | NOMINAL |
|---|---|---|---|---|
| Fluoride Compound | 50 to 95 | 60 to 90 | 65 to 90 | 70 calcium fluoride, 10 cerium fluoride, 3 potassium zirconium fluoride |
| Oxide Compound | 0 to 45 | 5 to 40 | 5 to 35 | 10 calcined alumina 5 periclase |
| Rare Earth Material | 1 to 25 | 2 to 20 | 2 to 15 | 10 cerium fluoride |
| Metallic | 0 to 25 | 1 to 20 | 1 to 15 | 2 electrolytic manganese |
| Potassium Material | 1 to 45 | 2 to 35 | 3 to 35 | 3 potassium zirconium fluoride |
| Carbonate | — | 0 to 15 | 0 to 5 | — |
| Binder | — | 0 to 35 | 1 to 35 | 20 potassium silicate, 2 lithium silicate, 2 water |

* All values expressed in Table 3 are in units of weight percent except the Nominal composition of the binder which is expressed in parts by weight. For purposes of the specification, it is possible for one material to serve as two more ingredients. For example, a material such as cerium fluoride is considered both as a fluoride compound and a rare earth material.

Fluorides are an essential ingredient to the flux system. The fluorides provide the proper electrical characteristics to form a molten slag pool that melts a metal strip traveling into the molten slag pool. Any combination of metal fluorides may be used to produce the electroslag flux. Fluoride ingredients that may be used individually or in combination include calcium fluoride, natural or synthetic cryolite, cerium fluoride, lithium fluoride, magnesium fluoride, strontium fluoride, potassium fluoride, potassium aluminum fluoride, potassium titanium fluoride, potassium zirconium fluoride and sodium fluoride. Insufficient fluoride content results in a slag pool having excess viscosity. Excess fluorides produce a slag pool having excess fluidity.

Oxides may optionally be added to the fluorides to control the fluidity of the flux and to serve as a slag former. Oxides that may be added to the flux system include rutile, calcium silicate, calcium oxide, nepheline syenite, quartz, magnetite, calcined alumina, magnesium oxide, potassium titanate, magnesium zirconate, zirconium oxide, cerium oxide and other are earth metal oxides. Alumina is a preferred oxide because of its relatively high melting point that provides excellent slag melting point control. In addition to alumina, 2 to 10 weight percent magnesium oxide (periclase) and/or zirconium oxide is most advantageously added to the flux to further improve performance of the slag system.

Addition of rare earth-containing material and potassium-containing material is essential for proper slag release. Advantageously, at least 1 wt % rare earth-containing material is added to the flux for effective slag removal. For purposes of this specification, rare earth is defined as the lanthanide series metals and yttrium. Advantageously, the rare earth material is a cerium compound. Most advantageously the rare earth containing material is a fluoride selected from the group consisting of cerium fluoride, cerium oxide and elemental cerium. Cerium fluoride has been found to greatly improve slag separation. The potassium-containing material is required in addition to rare earth material for effective slag removal. Potassium may be added in any form such as an oxide, silicate or fluoride. Most advantageously, potassium is added as a fluoride compound selected from the group consisting of potassium fluoride, potassium aluminum fluoride, potassium titanium fluoride and potassium zirconium fluoride. The above fluorides are typically not lost during baking of a binder system.

Optionally, metallics may be added directly to the flux for adjusting weld composition or to reduce the cracking tendency. Typical metallic additions that may be readily added to the electroslag flux include electrolytic manganese, chromium powder, nickel niobium, ferro colombium, Cr-Mo powder, Cr-Nb powder, Cr-W powder, ferro aluminum, ferro chrome, ferro manganese, ferro titanium, iron powder, molybdenum powder, nickel powder, nickel magnesium, tungsten, aluminum, and nickel titanium. Manganese has been found in particular to control cracking for copper-nickel alloys and nickel-chromium alloys. In addition metallic additions of nickel magnesium, titanium and aluminum may be used as deoxidizers for tying up nitrogen.

Binder may optionally be used to maintain the particle size of the flux. Increased particle size improves the feedability of the flux. The flux advantageously bound with a silicate binder such as sodium, potassium or lithium silicate. Most advantageously, the binder contains potassium silicate to further improve slag removal. Optionally, potassium may be added to the flux through the binder. However, it is more advantageous to add potassium through an ingredient that resists "burn off" during heat treatment. A specific binder that has been found to operate effectively as measured in parts in parts by weight is 20 potassium silicate (having a manufacturer's specification of 11.0–3.2% $K_2O$, 25.75–26.75% $SiO_2$, 2.05–2.15% $SiO_2+K_2O$, specific gravity at 20° C. of 1.37–1.40 g/cm$^3$ and a viscosity at 20° C. of 695–1395 centipoise), 2 lithium sodium polysilicate (having a manufacturer's specification of 1.7–1.9% $Li_2O$, 1.1–1.3% $Na_2O$, 17.8–22.2% $SiO_2$, pH of 10.6–10.8 and specific gravity at 25° C. of 1.19 g/cm$^3$) and 2 water. After the binder is mixed into the flux, the water is baked at a temperature of 371° to 537° C. as is known in the art to remove the water.

The potassium addition as a powder ingredient and/or a binder ingredient allows the flux to be produced as a "Fused" flux while maintaining all of the welding characteristics of the flux when bonded. The fused flux can be produced with or without the use of binder, since the binder is not necessary for manufacture of fused fluxes. Fused fluxes are produced by melting the fluxes together in a homogeneous mixture cooling to room temperature and crushing to size. The main advantages of fused fluxes over bonded fluxes are consistent particle size, elimination of fines, and moisture absorption by the flux is reduced significantly allowing for extended shelf life.

Optionally, the flux may contain up to 15% carbonates such as calcium carbonate (such as Marflux brand $CaCO_3$ or ground limestone), strontium carbonate, lithium carbonate, magnesium carbonate, lanthanum carbonate, manganese carbonate (such as TriManox brand $MnCO_3$), feldspar, dolomite or any combination thereof. Carbonates serve in the electroslag fluxes as slag formers. Most advantageously carbonates are limited to 5%.

An electroslag flux having the nominal composition of Table 3 (Flux A) was compared for operability with Sanvik Flux 59S. First a layer of Monel ® alloy 60 (a nickel-copper alloy) was electroslag welded onto an iron-base substrate to "butter" the iron-base alloy. Subsequent to the Monel alloy 60, three layers of Monel alloy 67 were electroslag welded onto the alloy 60. The alloy 67 strip was electroslag welded at a setting of 600–700 amps, 23–26 volts, 160–180 cm/min strip speed, 14–17 cm/min travel speed, 3–4 mm tie-in overlap and 30–40 mm tip-to-work distance. The alloy 67 welding strip had a width of 30 mm and a thickness of 0.5mm. Typical specified ranges for alloy 67 are 29–32 Ni, 0.04 Max.C, 1.0 max Mn, 0.4–0.7 Fe, 0.01 Max. S, 0.25 Max. Si, 0.2–0.5 Ti, 0.03 Max. P, 0.5 Max. impurities and balance Cu. Composition of the original weld strip alloy 67 and the resulting electroslag composition expressed in weight percent are provided below in Table 4.

TABLE 4

| Element | Monel alloy 67 Strip Composition | 4th Layer Cu—Ni Sanvik 59S | 4th Layer Cu—Ni Table 3 Flux |
|---|---|---|---|
| C | 0.02 | 0.010 | 0.018 |
| Mn | 0.73 | 0.59 | 1.19 |
| Fe | 0.55 | 0.94 | 0.94 |
| S | 0.001 | 0.004 | 0.002 |
| Si | 0.04 | 0.086 | 0.189 |
| Cu | 66.99 | 65.73 | 65.95 |
| Ni | 31.25 | 32.48 | 31.45 |
| Cr | — | 0.006 | 0.007 |
| Al | <0.01 | 0.055 | 0.070 |
| Ti | 0.42 | 0.072 | 0.142 |
| Mg | <0.01 | <0.001 | 0.01 |
| Co | 0.01 | 0.003 | 0.004 |
| Mo | — | <0.001 | <0.001 |
| Nb | — | 0.002 | 0.004 |
| Ta | — | <0.001 | <0.001 |
| P | 0.001 | <0.001 | <0.001 |
| B | — | 0.002 | 0.001 |
| Ca | — | 0.004 | 0.004 |
| Zr | — | <0.001 | 0.003 |
| V | — | <0.001 | <0.001 |
| W | — | 0.005 | 0.006 |
| Ce | — | <0.001 | 0.005 |

The copper-nickel alloy electroslag welded with the Sanvik 59S flux composition cracked and the Flux A rare earth-containing flux, did not crack. The weld bead produced using the Sandvik 59S flux did not contain a measurable amount of cerium. Flux A provided a weld bead with 0.005% cerium. This pick up of cerium in the weld bead is believed to tie up sulfur and promote slag release. Flux A provided an improved crack-free method of electroslag welding copper-nickel alloys.

Nickel-chromium alloy weld strips of filler metal alloy 625 and 686CPT TM having a width of 60 mm and a thickness of 0.5 mm were used for electroslag welding. (686CPT is a trademark of the Inco Family of Companies). Limiting composition of filler metal 625 is 58 min. Ni, 0.1 max. C, 0.5 max. Mn, 5 max. Fe, 0.015 max. S, 0.5 max, Si, 0.02 max. P, 20–23 Cr, 0.4 max Al, 0.4 max. Ti, 3.15–4.15 Nb+Ta, 8–10 Mo, 1 max. Co, 0.5 max, Cu and 0.5 max. impurities. Limiting composition of filler metal 686CPT TM is 0.01 max. C, 1.0 max, Mn, 5.0 max. Fe, 0.02 max. P, 0.01 max. S, 0.5 max. Al, 0.20 max. Cu, 0.08 max. Si, 19.0–23.0 Cr, 15.0–17.0 Mo, 3.0–4.4 W, 0.5 max. Others, balance Ni. Flux A, Nippon WELSUBF-13, Sandvik 59S and Sondometal EST201 were all electroslag welded using a Miller CP/CC-1500. The fluxes were all baked at 468° C. for two hours prior to welding to remove water vapor. Steel plates having dimensions of 30.5 cm×33 cm, and a thickness of 3.8 cm or 5.1 cm, were sandblasted and ground prior to electroslag welding. Iron dilution of the first weld bead of the first weld layer is reported below in Table 5.

TABLE 5

| FLUX | STRIP | Fe DILUTION % | AMPS | VOLTS | WIRE FEED RATE cm/min. | TRAVEL SPEED cm/min. |
|---|---|---|---|---|---|---|
| NIPPON WELSUBF-13 | 625 | 14.34 | 1160 | 24 | 165 | 16.5 |
| SANDVIK 59S | 625 | 12.06 | 1160 | 24 | 165 | 16.5 |
| SOUDOMETAL EST201 | 625 | 10.95 | 1160 | 24 | 165 | 16.5 |
| FLUX A (20 mesh) (840 micron) | 625 | 11.16 | 1160 | 24 | 165 | 16.5 |
| FLUX A (10 mesh) (1,680 micron) | 625 | 10.21 | 1160 | 24 | 165 | 16.5 |
| FLUX A (5 mesh) (4,000 micron) | 625 | 10.80 | 1160 | 24 | 165 | 16.5 |
| NIPPON WELSUBF-13 | 686 | 18.75 | 1160 | 24 | 165 | 16.5 |
| SANDVIK 59S | 686 | 6.95 | 1160 | 24 | 165 | 16.5 |
| SOUDOMETAL EST201 | 686 | 9.03 | 1160 | 24 | 165 | 16.5 |

| FLUX | STRIP | Fe DILUTION % | AMPS | VOLTS | WIRE FEED RATE cm/min. | TRAVEL SPEED cm/min. |
|---|---|---|---|---|---|---|
| FLUX A | 686 | 6.79 | 1160 | 24 | 165 | 16.5 |

The data of Table 5 illustrated that Flux A provided a commercially acceptable level of iron dilution for electroslag welding nickel-chromium alloys. Under the welding conditions tested the Nippon WELSUBF-13 performed poorly and the remaining fluxes including Flux A operated well.

Similarly, Flux A was tested for electroslag welding of nickel strip. Sound welds were produced using filler metal 61 in combination with Flux A. Filler metal 61 has a limiting composition of 93 min. Ni, 0.15 max. C, 1 max. Mn, 1 max. Fe, 0.015 max S, 0.75 max. Si, 0.25 max. Cu, 1.5 max. Al, 2–3.5 Ti, 0.03 max. P and 0.5 max. others. However, the electroslag welding of nickel strip on iron-base alloys provided greater dilution than similar electroslag welding with copper-nickel and nickel-chromium alloys.

The Flux of the invention has provided an electroslag welding flux with unique welding properties. The flux contains a combination of rare earths and potassium to produce an electroslag welding flux capable of welding copper-base alloys. The flux of the invention is particularly effective for welding copper-nickel alloys. An additional advantage of the flux is the flexibility to effectively weld both copper-nickel and nickel-chromium alloys with minimal iron dilution. The electroslag flux of the invention has also been found to effectively weld nickel filler metal.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A flux useful for electroslag welding metals consisting essentially of in weigh percent: 50 to 95 fluoride compound, 0 to 45 oxide compound, 1 to 25 rare earth-containing material, 1 to 45 potassium-containing material and 0 to 25 total metallics.

2. The flux of claim 1 wherein said rare earth compound is a cerium compound.

3. The flux of claim 1 wherein said fluoride compound is a cerium fluoride compound.

4. The flux of claim 1 further including a binder for maintaining particle size of the flux.

5. The flux of claim 4 wherein said binder includes potassium silicate.

6. A flux useful for electroslag welding metals consisting essentially of in weight percent: 50 to 90 fluoride compound, 5 to 40 oxide compound, 2 to 20 rare earth material, 1 to 20 metallic, 2 to 35 potassium-containing material, 0 to 15 carbonate and 0 to 35 parts by weight binder.

7. The flux of claim 6 wherein said rare earth compound is a cerium compound.

8. The flux of claim 6 wherein said fluoride compound includes a cerium fluoride compound.

9. The flux of claim 6 wherein said potassium containing compound includes potassium fluoride compound.

10. A flux useful for electroslag welding metals consisting essentially of in weight percent: 50 to 90 fluoride compound, 5 to 35 oxide compound, 2 to 15 rare earth-containing material, 1 to 15 total metallics, 3 to 35 potassium-containing material, 0 to 5 carbonate and 1 to 35 parts by weight binder.

11. The flux of claim 10 wherein said rare earth-containing compound is a cerium fluoride compound.

12. The flux of claim 11 wherein said potassium-containing material includes potassium fluoride compound.

13. The flux of claim 12 wherein said potassium-containing material includes potassium zirconium fluoride.

14. The flux of claim 13 wherein said flux contains 2 to 10 periclase, 5 to 15 alumina and 0.5 to 6 manganese.

15. The flux of claim 10 wherein said binder is a silicate binder.

16. A method of electroslag welding including the step of heating a flux consisting essentially of, in weight percent, 50 to 95 fluoride compound, 0 to 45 oxide compound, 1 to 25 rare-earth containing compound, 1 to 45 potassium containing material and 0 to 25 total metallics on a base metal by electrical resistance to form a molten slag pool; and melting a metal strip within said molten slag pool.

17. The method of claim 16 wherein a flux consisting essentially of, in weight percent, 50 to 90 fluoride compound, 5 to 40 oxide compound, 2 to 20 rare earth material, 1 to 20 total metallics, 2 to 35 potassium-containing material, 0 to 35 parts by weight binder is heated.

18. The method of claim 17 wherein a copper-nickel metal strip is melted within said molten slag pool.

19. The method of claim 16 wherein a flux consisting essentially of, in weight percent, 50 to 90 fluoride compound, 5 to 35 oxide compound, 2 to 15 rare earth-containing material, 1 to 15 total metallics, 3 to 35 potassium-containing material, 0 to 5 carbonate and 1 to 35 parts by weight binder is heated.

20. The method of claim 19 wherein a copper-nickel metal strip is melted within said molten slag pool.

* * * * *